US009186988B2

(12) United States Patent
Wimmer et al.

(10) Patent No.: US 9,186,988 B2
(45) Date of Patent: Nov. 17, 2015

(54) CONTROL SYSTEM FOR A MOTOR VEHICLE HAVING AN ELECTRONIC CONTROL UNIT BY WHICH THE DRIVE TORQUE OF A DRIVE UNIT CAN BE VARIABLY DISTRIBUTED, AS REQUIRED, ON AT LEAST TWO AXLES

(71) Applicant: Bayerische Motoren Werke Aktiengesellschaft, Munich (DE)

(72) Inventors: Christian Wimmer, Munich (DE); Dirk Odenthal, Munich (DE); Michael Sailer, Mering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/277,917

(22) Filed: May 15, 2014

(65) Prior Publication Data
US 2014/0343774 A1 Nov. 20, 2014

(30) Foreign Application Priority Data

May 15, 2013 (DE) .......................... 10 2013 208 965

(51) Int. Cl.
*B60W 10/119* (2012.01)
*B60K 23/08* (2006.01)
*B60W 10/06* (2006.01)
(Continued)

(52) U.S. Cl.
CPC ............... *B60K 23/0808* (2013.01); *B60K 6/52* (2013.01); *B60W 10/06* (2013.01); *B60W 10/08* (2013.01); *B60W 20/10* (2013.01); *B60W 30/18172* (2013.01); *B60K 2023/085* (2013.01); *Y02T 10/6286* (2013.01); *Y10S 903/93* (2013.01)

(58) Field of Classification Search
None
See application file for complete search history.

(56) References Cited

U.S. PATENT DOCUMENTS 7,330,785 B2 2/2008 Odenthal et al.
7,506,508 B2 3/2009 Sumser et al.
(Continued)

FOREIGN PATENT DOCUMENTS

DE          100 54 023 A1    5/2002
DE    10 2004 035 004 A1    2/2006
(Continued)

OTHER PUBLICATIONS

Fischer et al., "x-Drive-The New All-Wheel Drive in the BMW X3 and BMW X5," Automobiltechnische Zeitschrift ATZ, 2004 (ten (10) pages).

(Continued)

*Primary Examiner* — Thomas Tarcza
*Assistant Examiner* — Richard Goldman
(74) *Attorney, Agent, or Firm* — Crowell & Moring LLP

(57) ABSTRACT

A control system and method are provided for a motor vehicle having an electronic control unit, by which the drive torque of a drive unit can be variably distributed, as required, to at least two axles. A drive-oriented control can be specified for the purpose of a primarily single-axle drive. By way of a comparison unit, preferably on the basis of a circle of forces, a driving-dynamic desired parameter demanded particularly on a basis of the driver's intention is compared with a driving-dynamic potential parameter. A change from the drive-oriented control to a driving-dynamics-oriented control for the purpose of a primarily multi-axle drive takes place only when a defined threshold value, for example, 70%, is exceeded relative to the driving-dynamic potential parameter, for example, a limit range of the circle of forces.

14 Claims, 3 Drawing Sheets

(51) Int. Cl.
- *B60W 10/08* (2006.01)
- *B60W 20/00* (2006.01)
- *B60K 6/52* (2007.10)
- *B60W 30/18* (2012.01)

(56) References Cited

U.S. PATENT DOCUMENTS

| | | |
|---|---|---|
| 7,540,149 B2 | 6/2009 | Sumser et al. |
| 8,078,374 B2 | 12/2011 | Vogel et al. |
| 8,504,273 B2 | 8/2013 | Bonfigt et al. |
| 2010/0076657 A1* | 3/2010 | Jinno et al. ............... 701/70 |
| 2010/0138090 A1* | 6/2010 | Jinno et al. ............... 701/22 |
| 2011/0130901 A1* | 6/2011 | Mori et al. ............... 701/22 |
| 2013/0046427 A1* | 2/2013 | Hohenberg ............... 701/22 |
| 2013/0179017 A1* | 7/2013 | Bartels et al. ............... 701/22 |
| 2014/0172215 A1* | 6/2014 | Bartels et al. ............... 701/22 |
| 2014/0195079 A1* | 7/2014 | Derflinger et al. ............... 701/22 |
| 2014/0343770 A1* | 11/2014 | Sponheimer et al. ............ 701/22 |
| 2014/0343774 A1* | 11/2014 | Wimmer et al. ................. 701/22 |
| 2015/0120106 A1* | 4/2015 | Yu et al. ........................... 701/22 |

FOREIGN PATENT DOCUMENTS

| | | |
|---|---|---|
| DE | 10 2004 035 044 A1 | 3/2006 |
| DE | 10 2006 001 297 A1 | 7/2007 |
| DE | 10 2006 037 818 A1 | 2/2008 |
| DE | 10 2009 055 683 A1 | 5/2011 |
| DE | 10 2011 005 095 A1 | 9/2012 |
| JP | 9-284911 A | 10/1997 |

OTHER PUBLICATIONS

German Search Report dated Oct. 8, 2014, including English translation (twelve (12) pages).
Mitschke et al. "Dynamics of Motor Vehicles," 2004, pp. 42-44, 680-681, 4th edition, Berlin (five (5) pages).

* cited by examiner

US 9,186,988 B2

CONTROL SYSTEM FOR A MOTOR VEHICLE HAVING AN ELECTRONIC CONTROL UNIT BY WHICH THE DRIVE TORQUE OF A DRIVE UNIT CAN BE VARIABLY DISTRIBUTED, AS REQUIRED, ON AT LEAST TWO AXLES

CROSS REFERENCE TO RELATED APPLICATIONS

This application claims priority under 35 U.S.C. §119 from German Application No. 10 2013 208 965.1, filed May 15, 2013, the entire disclosure of which is herein expressly incorporated by reference.

BACKGROUND AND SUMMARY OF THE INVENTION

The invention relates to a control system for a motor vehicle having an electronic control unit by which the drive torque of a drive unit can be variably distributed, as required, to at least two axles.

With respect to the technical background, reference is made, for example, to the applicant's following patent documents: German Patent Document DE 10 2004 035 004 A1: Example of a Model-Supported Pilot Control for Increasing the Directional Control; German Patent Document DE 10 2011 005 095 A1: Approach to the Energy-Efficient Control of a Conventional All-Wheel Concept; and German Patent Document DE 10 2006 001 297 A1: Approach Analyzing the Potential Reserves of Individual Wheels with Respect to Longitudinal and Transverse Dynamics by Sensors for Measuring the Tire Deformations.

It is an object of the invention to improve a method of the above-mentioned type with regard to energy efficiency and to create a simple control for this purpose.

According to the invention, this task is achieved by providing a control system and method for a motor vehicle having an electronic control unit, by which the drive torque of a drive unit can be variably distributed, as required, to at least two axles. Basically, a drive-oriented control can be specified for the purpose of a primarily single-axle drive. A comparison unit compares a demanded driving-dynamic desired parameter with a driving-dynamic potential parameter. A change from the drive-oriented control to a driving-dynamics-oriented control for the purpose of a primarily multi-axle drive takes place only when a defined threshold value is exceeded relative to the driving-dynamic potential parameter.

The invention relates to a control system for a motor vehicle having an electronic control unit by which the drive torque of a drive unit can be variably distributed, as required, to at least two axles, basically a drive-oriented control being specifiable for the purpose of a primarily single-axle drive. In this case, by way of a comparison unit, preferably on the basis of the circle of forces, a driving-dynamic desired parameter demanded particularly on the basis of the driver's intention is compared with a driving-dynamic potential parameter. A change from the drive-oriented control to a driving-dynamics-oriented control for the purpose of a primarily multi-axle drive will take place only when a defined threshold value (for example, 70%) is exceeded relative to the driving-dynamic potential parameter (for example, the limit range of the circle of forces).

A transition to a driving-dynamics-oriented control for the purpose of a primarily multi-axle drive can take place discretely or continuously, for example, as a function of time, path or driving-dynamics parameters.

Particularly within the scope of hybrid vehicles, the term "drive-oriented control" applies not only to a short-term solely fuel-minimizing efficiency-oriented control but generally also to a longer-term control aimed at the maximal availability of the demanded overall power, electric power and/or the axle-related drive torque distribution. Separately, drive-related controls of the drive components in the case of hybrid vehicles are also already known as so-called hybrid operating strategies.

The invention is independent of the drive concept of a motor vehicle. It can be applied to a conventional all-wheel drive vehicle with a controllable longitudinal clutch as well as to a hybrid motor vehicle with drive motors assigned to each axle (such as an axle split hybrid or an arbitrary other combination having a combustion engine and/or an electric machine at one axle and a combustion engine and/or electric machine at the other axle(s)).

Particularly in the case of conventional all-wheel drive vehicles with drive motors at only one axle, a pure single-axle drive is specified as the drive-oriented control for optimizing the efficiency or minimizing fuel. The (driving-dynamics) control unit for implementing the invention is preferably uncoupled from a (drive) control unit for triggering the drive components (for example, the electric motor and the internal-combustion engine). Therefore, the drive control unit could specify a single-axle drive which, as required, could, however, be oversteered by the driving-dynamics control unit.

The invention is based on the following recognitions and ideas of the inventors. In the following, the special case of a two-axle-driven vehicle (four-wheel/all-wheel-drive) is treated in the present invention as an example. However, the invention explicitly includes its use in the case of multi-axle-driven and multi-track-driven vehicles, without any constant reference in the following.

Conventional, two-axle-driven vehicles are characterized in that one axle is driven directly by a torque source (for example, an internal-combustion engine) (primarily driven axle), and a second axle can be linked by way of a clutch element (friction, multiple-disk, jaw clutch) (secondarily driven axle).

In addition, electronic control systems for the variable drive torque distribution make it possible that the driving forces or drive torques are distributed between the axles according to the situation. This approach has the significant advantage that the best traction can be provided as a function of the driving situation. As an example, reference is made to the xDrive System used at BMW Group, which is described, for example, in the technical article "x-Drive—The New All-Wheel Drive in the BMW X3 and BMW X5" by G. Fischer, W. Pfau, H.-S. Braun and C. Billing (published in *Automobiltechnische Zeitschrift ATZ*, Edition Number 2004-02; Published Patent Application DE 100 54 023 A1).

In addition to conventional all-wheel drive vehicles, hybrid concepts also permit the implementation of a two-axle drive. However, differently than in the case of conventional concepts, the differentiation between (particularly directional-control-related) driving-dynamics-oriented and (particularly, efficiency-related) drive-oriented driving does not take place exclusively by way of the number of the driven axles or the drive torque distribution on the driven axles. Rather, the electronic control is based on driving strategies which, during drive-oriented driving, place the driving performance as well as the consumption-optimizing drive strategies for triggering the drive components in the foreground. In contrast, in the case of driving-dynamics-oriented driving, the drive torque distribution on the axle is placed in the foreground:

Conventional all-wheel vehicles—
Drive- or efficiency-oriented control:
Drive torque distribution single-axle (clutch disengaged)
Driving-dynamics-oriented control:
Drive torque distribution two-axle (clutch at least partially engaged); according to the situation, connecting of the secondarily driven axle and variable drive torque distribution for optimum driving-dynamics, for example, with respect to the self-steering effect when driving or coasting, traction when driving straight ahead or cornering and directional control with respect to under- or over-steering.

Hybrid all-wheel vehicles, particularly axle hybrids—
Drive- or efficiency-oriented control:
Direct triggering of the drive components with, the drive strategy takes place in an optimized manner according to the demanded driving performance, the accumulator (energy store) condition, the accumulator charging strategy and/or the consumption.

Driving-dynamics-oriented control:
Direct triggering of the drive components with the driving-dynamics strategy for the drive torque distribution in an optimized manner according to driving-dynamics, for example, with respect to the self-steering effect when driving or coasting, traction when driving straight ahead or cornering and directional control with respect to under- or over-steering.

Furthermore, the embodiment of a hybrid vehicle is called an axle hybrid, in which the front axle or rear axle is driven directly by an internal-combustion engine and the respective second axle is driven directly by an electric motor (for example, also known as an axle-split hybrid). As an example, reference is made to the hybrid BMW i8 sports car, for which this concept is implemented in series.

The introduced axle hybrid technique represents a suitable implementation form for an all-wheel-driven vehicle particularly because:

a) in comparison to conventional all-wheel concepts, the necessity of a mechanical clutch connection between the front axle and the rear axle is eliminated, and b) because of the electronic vehicle control, several driving modes are available (for example, purely as an internal-combustion engine, purely electrically, in a combined manner), and an all-wheel drive can thereby be implemented which can be variably connected.

In addition to the described advantageous embodiment within the scope of an axle hybrid, it should be stressed here that the method introduced in the following can in principle be used for controlling any two-axle or multi-axle drive concept. Thus, the following range of applications is explicitly also a component of the present invention without continuous corresponding reference in the following: use in conventional all-wheel drives, use in axle hybrid variants with more than one electric motor at at least one of the two/several axles, use in hybrid drive concepts with an arbitrary combination of primary and secondary energy sources (such as hydrogen drives in a different technological implementation, fuel cell, etc.).

In the case of electronically controlled motor vehicles, particularly all-wheel drive vehicles, basically—driving-dynamic and therefore also driving-safety-influencing demands, such as longitudinal and transverse guidance stability, are in the foreground. A drive according to the driving-dynamics strategy (more precisely, the operation of two or more axles), however, discloses the disadvantageous feature that the fuel consumption is thereby increased. In the case of conventional all-wheel drive vehicles with a mechanical coupling, this is the result of combined sliding and rolling friction losses and inertia-related losses, which necessarily occur when driving a secondary axle.

In contrast, the invention is based on the recognition that the potential for saving fuel will be lost as a result of a mainly dynamic focusing when laying out the vehicle control. Thus, a plurality of driving situations with relatively low driving-dynamic demands exists, in which a transition can take place to the preferably efficiency-oriented drive strategy, or in which the single-axle drive is sufficient in the case of conventional all-wheel vehicles. Examples are extended straight-ahead driving, driving at a moderate vehicle velocity (for example, up to 100 km/h), driving on routes with almost no gradient as well as driving on a dry road.

A method is therefore provided according to the invention for improving the energy efficiency in two-axle driven or multi-axle driven vehicles. As described in the following, a novel control is disclosed.

A fundamental aspect of the invention is based on replacing, in a motor vehicle with a contemplated all-wheel drive, the previously mainly dynamics-oriented control of the drive torque distribution by an approach for improving the energy efficiency by use of a basically drive-oriented control of the drive torque distribution.

Such a novel control system provides that the desired driving-dynamic parameters resulting from the driver's intention be compared with driving-dynamic potential parameters relative to the drive torque distribution on the existing axles preferably according to the circle of forces, and a decision be made on the basis of the comparison result between a drive strategy or efficiency strategy or a driving-dynamic strategy. For increasing the efficiency, primarily the drive strategy is preferred over the driving-dynamic strategy, because the driving-dynamic strategy provides a primarily multi-axle drive for the benefit of the directional control but at the expense of the efficiency. A more uniform distribution of the drive torques onto the drivable axles therefore takes place here than in the case of a drive strategy which provides a primarily single-axle drive relative to the performance or the consumption.

Determination of the Driving-Dynamic Desired and Potential Parameters.

The driver's intention concerning the longitudinal and transverse driving-dynamics of the vehicle is obtained by way of the brake and/or accelerator pedal position, including the clutch position and the selected gear, as well as by way of the steering wheel position. At the same time, each tire (or each axle) can transmit only a certain total force to the road, whereby a maximal potential of longitudinal and transverse forces is predefined. According to a teaching familiar to a person skilled in the art, the limits of this driving-dynamic potential can be described by generating the circle of forces. In principle, a vehicle reaches a higher overall potential by connecting a secondary drive axle, so that the circumference of the circle of forces is enlarged (increase of longitudinal and transverse potential).

The comparison between the driver's intention and the driving-dynamic potential takes place by use of a model-supported pilot control. This relationship results in a control signal with the information of whether the driving-dynamic values intended by the driver fall into the limit range of that potential that is available in the momentary operating state of the vehicle.

For hybrid concepts (particularly axle hybrids), the calculated ratio represents a decision criterion with respect to shifting between the drive strategy and the driving-dynamics strategy. In the former, the driver's intention is weighed against the respectively maximally possible potential of the front axle and rear axle. As soon as the driving-dynamic desired values move in the limit range of one of the two axles and thereby the saturation of this axle is thereby achieved, the control will shift to the driving-dynamic strategy and, from then on, prioritizes by way of the drive torque distribution at the axles. For conventional all-wheel drive concepts, the decision is made with respect to a single-axle or multi-axle drive state.

By means of the new control, it is therefore achieved that:

a) in driving-safety-critical situations, a prioritization takes place with respect to the driving-dynamics (in the case of high driving-dynamic demands), and b) in other situations, a decision is made in favor of a drive-oriented and, in this case, particularly energy-efficient, and therefore fuel-saving, interpretation.

The control system introduced according to the invention has the effect that a fuel-intensive operation predominates exclusively in situations in which, for reasons of driving-dynamics and directional control, this operation is necessary (limit range of the circle of forces). The significant advantage of the invention therefore consists of implementing the use of a variable all-wheel drive in a particularly energy-efficient manner without any losses with respect to driving safety.

Driving-dynamic disadvantages do not have to be feared here because in critical driving situations (for example, cornering), the prioritization continues with respect to driving-dynamics and the driver has the entire driving-dynamic potential of the vehicle available to him. For this purpose, the invention additionally provides that the control be adapted along a characteristic speed curve such that the change-over to the all-wheel drive will take place earlier at low speeds. However, beyond that, other application diagrams are also contemplated.

Additional significant advantages of the introduced method are its high adaptability and simple application. Since the basic construction of the control follows a simple physical approach and is based on current driving state variables, the weighting mechanism can be correspondingly variably adapted (according to mass, coefficient of friction, etc.). Thus, for example, when determining the driving-dynamic desired parameter and the driving-dynamic potential parameter, the loading condition of the vehicle can be taken into account or the pulling-along of a trailer or the towing of a vehicle can detected. In this case, it is sufficient for the application of the method to set a corresponding characteristic application curve once, while the variable adaptation takes place automatically on the basis of the estimation of the state values.

It is further possible to support the control system by use of state measurements and thereby protect it from failure it in a more stable manner. In a preferred embodiment, the inventors provide the estimation of the relevant driving state variables (pilot control). Should this fail, however, measurements could be used, even if this would result in longer response times.

Further Application Possibilities.

The introduced method is, among other things, capable of causing the additional start of a second drive. Should the driver have selected, for example, the purely electric driving mode and exceed the performance range of the electric motor by gas and steering inputs, the internal-combustion engines is additionally connected without an intervention by the driver, in order to ensure maximal driving comfort.

Furthermore, the implementation of an acknowledgement to the driver is conceivable, perhaps by way of a force feedback pedal or by way of the steering wheel. By the comparison of the driving-dynamic desired parameter with the driving-dynamic potential parameter as the central actuating variable, it can be signaled to the driver by way of the accelerator pedal that the limit range is reached and the additional connection of the all-wheel drive will take place shortly, if the desired values remain unchanged by the driver.

The option of the shifting suppression could have the purpose of preventing an undefined vehicle handling. Should the control determine driving-dynamic values which are in the limit range of the circle of forces, the shifting operating is therefore blocked for this time period.

Furthermore, the method can be used for activating further efficiency-improving mechanisms based on the information of the potential comparison. The use in a conventional all-wheel system with a Haldex clutch is an example. Thus, the evaluation of the defined actuating variable can be used for switching off the pump required for the Haldex clutch, as soon as no additional connection of a secondary axle has no longer been necessary for an extended time period. The switching-off of such elements can additionally lower the fuel consumption.

Finally, the combination of the introduced method with further controls may also be considered, for example, with a engine/brake intervention. In the example of a blocked all-wheel drive, a traction/transverse driving-dynamics optimization is still possible only by way of a total torque reduction. In the approach illustrated here, this case can be recognized by a balancing against the driver's demands. Concretely, in this case, the driver's demands would be above the potential of ail already connected axles, so that the necessity of a total torque slow-down by means of an engine or brake intervention is recognized and is communicated to corresponding systems. As an example, reference is made to German Published Patent Application DE 10 2009 055 683 A1.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
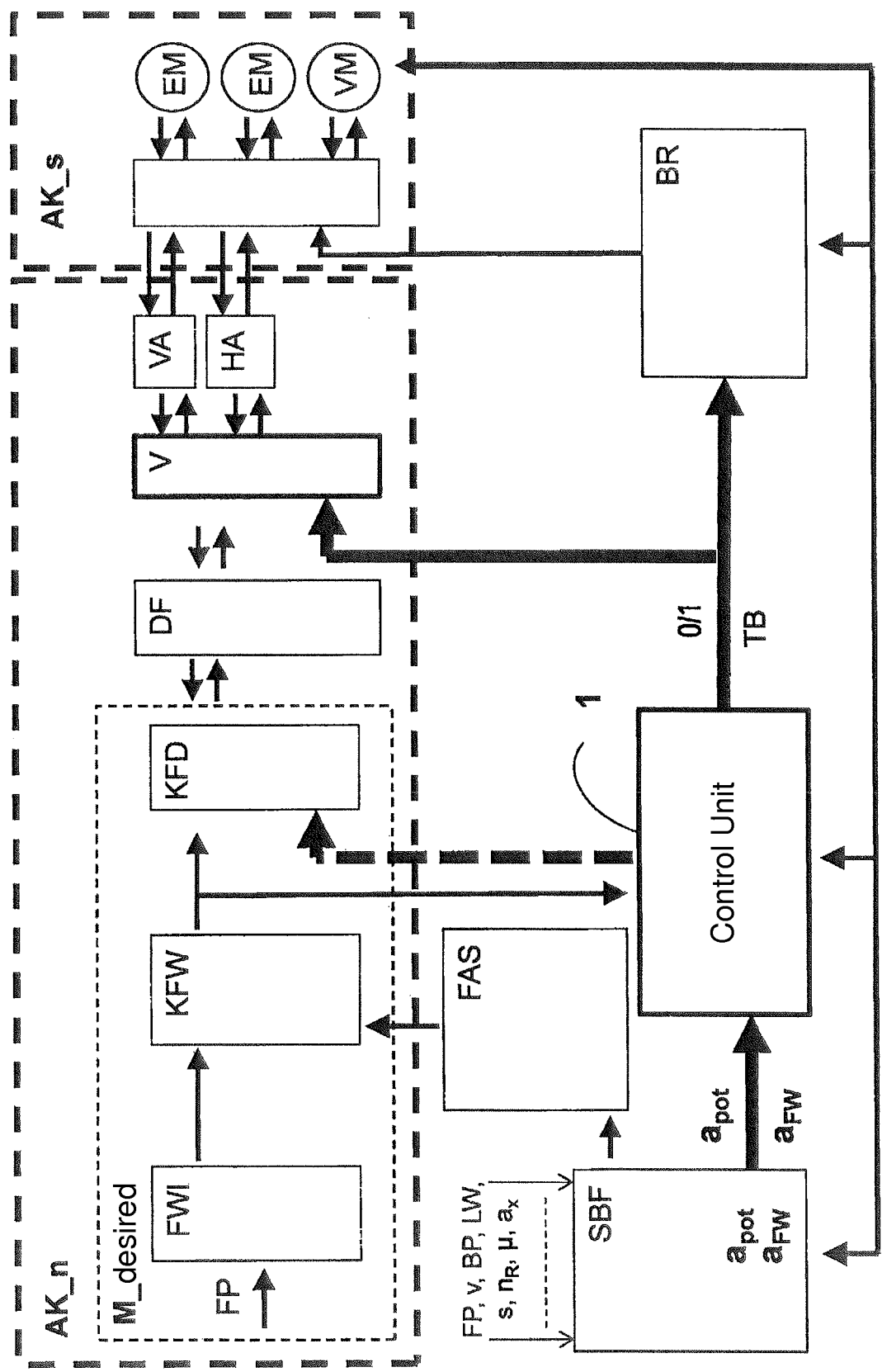
FIG. 1 is a schematic block diagram representation of the entire drive concept, in which the control system according to the invention is embedded.

FIG. 1 is a schematic block diagram view of a total drive concept of a, here, two-axle motor vehicle (having a front axle VA and a rear axle HA) based on the most important input signal for the determination of the longitudinal-acceleration-related driver's intention, which is the accelerator pedal value FP. The drive concept contains essentially the following components and function blocks.

In the drive-concept-neutral block AK_n, the desired drive torque M_desired is formed starting from the accelerator pedal value FP, by use of a driver's intention coordinator KFW and by use of a driving-dynamics coordinator KFD. This drive torque M_desired is transmitted by way of a driving-dynamic filter DF to the distributor block V.

In the distributor block V, the decision is made concerning the distribution ratio VA/HA (drive torque distribution) of the fraction of the drive torque M_desired to be transmitted by the front axle VA to the fraction of the drive torque M_desired to be transmitted by the rear axle HA. In the drive-concept-specific block AK_s, the predefined drive torque distribution is set by way of the drive unit—here consisting of two electric motors EM assigned to the front axle VA and one internal-combustion engine VM assigned to the rear axle HA. In the case of a negative drive torque, a brake control BR can also intervene. Here, the drive concept is therefore an axle hybrid.

Parallel to the above-mentioned function blocks, which may preferably be executed in an electronic drive control device, the following function blocks become useful, which are preferably contained in an electronic driving-dynamics control device.

A driving-dynamics-signal-providing block SBF provides, for example, determined operating variables, such as the rotational wheel speeds $n_R$, the steering angle LW, the vehicle velocity v, the brake pedal value BP, the coefficient of friction $\mu$, the slope s, the longitudinal acceleration $a_x$, the tractive resistance and the accelerator pedal value FP.

The core of the control system according to the invention is the control unit 1, which is connected with the driving-dynamics-signal-providing block SBF. From the block SBF, the control unit 1 receives particularly the driving-dynamic desired parameter, here, in the form of a longitudinal, as well transverse driving-dynamics-oriented driver's intention $a_{FW}$, and the driving-dynamic potential parameter, here in the form of a longitudinal, as well as transverse, driving-dynamics-oriented maximal acceleration $a_{pot}$, as input signals.

By means of a driving-dynamic drive torque distributor, the control unit 1 generates, for example, as a first output signal, only the binary decision 0 or 1 for or against a multi-axle drive: 0 for a single-axle drive 2WD or 1 for a multi-axle drive 4WD.

In addition or as an alternative, the control unit 1 can generate, as a second output signal, at least one tolerance range TB for the distribution ratio VA/HA of the drive torque M_desired, particularly when no decision has yet been made for a multi-axle drive 4WD. By way of a driving-dynamic drive torque pilot control, the amount of the drive torque M_desired can also be influenced by way of the driving-dynamics coordinator KFD.

In principle, the control unit 1 specifies a drive-oriented control such as a primarily single-axle drive 2WD. Concerning the approach for the transition to a multi-axle drive 4WD, reference is made to FIG. 2.

Figure 2:
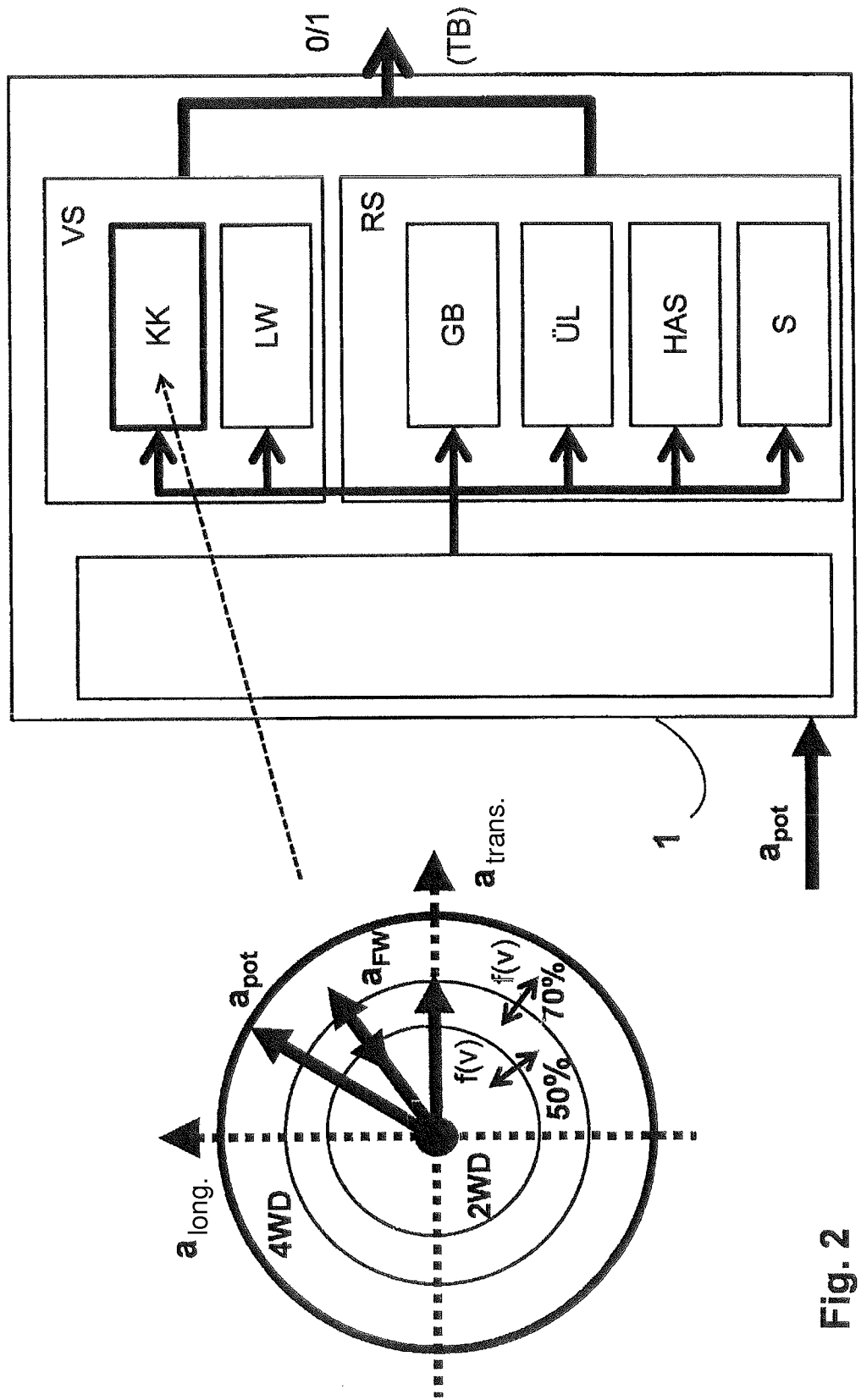
FIG. 2 is a more detailed representation of the functions of the control system according to the invention.

FIG. 2 illustrates the control unit 1 in greater detail. It primarily describes an "all-wheel requirement situation detection—thus, the 0/1 decision for or against an all-wheel drive.

It is essential for the invention that, in a pilot control block VS, a comparison unit KK preferably compares, by way of a circle of forces illustrated on the left, a demanded driving-dynamic desired parameter $a_{FW}$ with a driving-dynamic potential parameter $a_{pot}$. The demanded driving-dynamic desired parameter $a_{FW}$ is preferably determined from a desired longitudinal acceleration $a_{longitudinal}$ based on the accelerator pedal value FP and/or the brake pedal value BP and from a desired transverse acceleration $a_{transverse}$ based on the steering angle LW and the vehicle velocity v. Here, a change-over or transition is then made from the drive-oriented control 2WD to a driving-dynamics-oriented control 4WD when the demanded driving-dynamic desired parameter $a_{FW}$ exceeds a defined threshold value (for example, 70%) relative to the driving-dynamic potential parameter $a_{pot}$.

The driving-dynamic potential parameter $a_{pot}$ is the resultant of the directional-control-related maximally possible longitudinal acceleration $a_{longitudinal}$ and the maximally possible transverse acceleration $a_{transverse}$. It is particularly a function of the coefficient of friction, the slope, the aerodynamic drag and/or the towed mass.

During the change-over from 0 to 1, in addition, in a reactive block RS, the following driving-dynamic driving states can also be taken into account: counter-steering GB, over-steering ÜL, rear-axle saturation HAS, and slip S.

During the transition from the multi-axle drive 4WD to the single-axle drive 2WD, the circle of forces may follow a hysteresis. Thus, in the illustrated example, this transition takes place at a threshold value of 50% of the potential parameter $a_{pot}$. The threshold values (here, 70% and 50%) for the transition from the drive-oriented control to the driving-dynamics-oriented control, and vice versa, are preferably a function of the momentary vehicle velocity v (see Function f(v) at double arrows in FIG. 2).

In order to avoid a constant change from multi-axle and single-axle operation, the hysteresis effect can additionally also be achieved by way of a path or time condition in that a change-over into the respective other state is prevented for x seconds and/or y meters.

Figure 3:
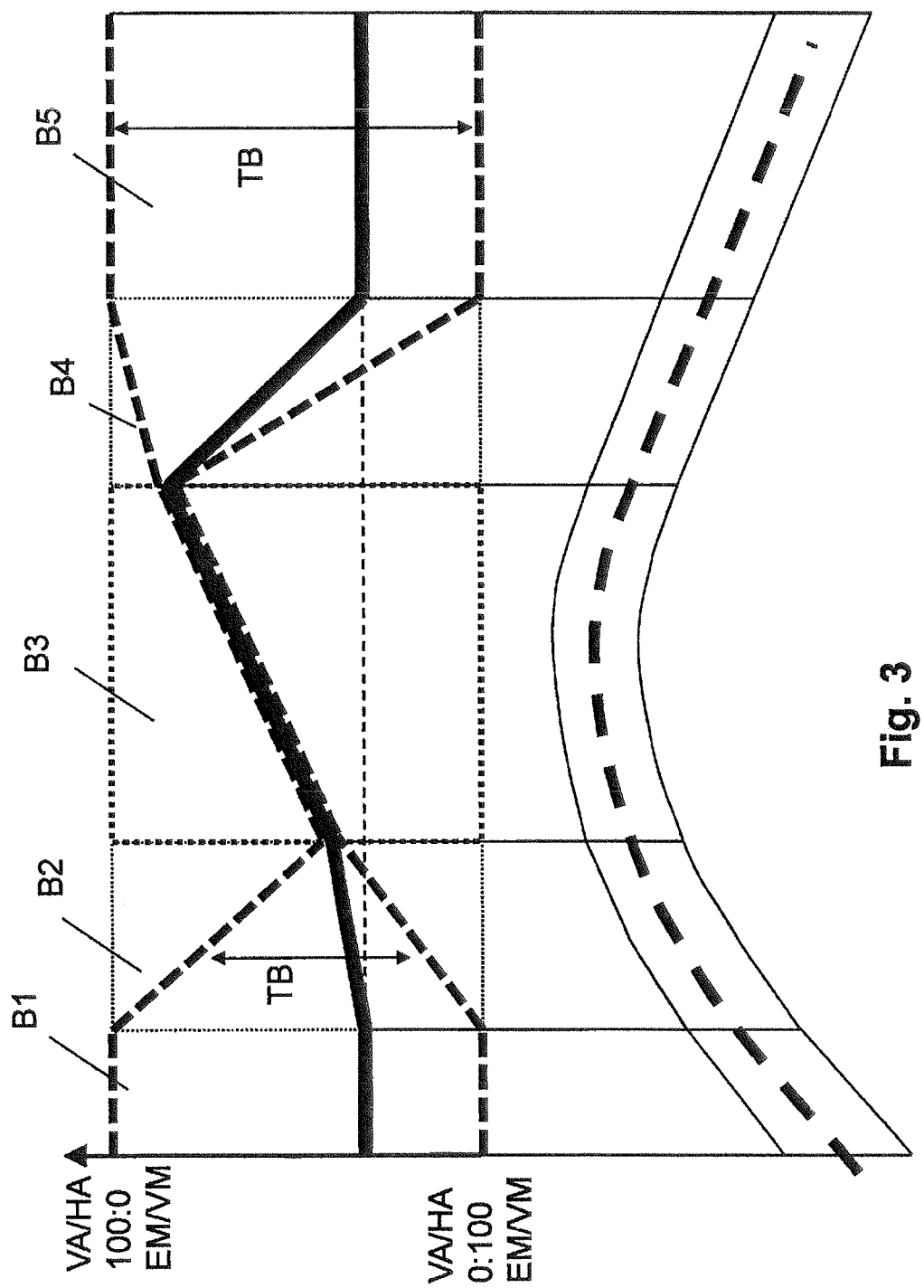
FIG. 3 is a view of an embodiment for illustrating the functions of the invention in the case of a transition from a, here, efficiency-related drive-oriented control to a driving-dynamics-oriented control.

FIG. 3 illustrates an example of the functions of the invention during a transition from straight-ahead driving with a drive-oriented control to a cornering with a driving-dynamics-oriented control, and back again.

In areas B1 and B5, a maximal drive-oriented control takes place in that, here, a maximal tolerance range TB for the distribution ratio VA/HA is predefined. This also corresponds to decision 0, according to which a single-axle drive 2 WD can be permitted in an unlimited manner. In areas B2 and B4, a continuous transition takes place from the drive-oriented to the driving-dynamics-oriented control, in that here, a limiting tolerance range TB for the distribution ratio VA/HA is specified. This corresponds to decision 1, according to which a single-axle drive 2WD is no longer admitted in an unlimited manner. In area B3, an exclusively driving-dynamics-oriented control takes place in which a precise driving-direction-controlling course of the drive torque distribution VA/HA is specified.

However, in contrast to the state of the art, the invention carries out a driving-dynamics-oriented control only in a driving-dynamic limit situation as an exception, whereas, in the normal case, a drive-oriented control primarily leads to the reduction of the fuel consumption, but also to maximizing the availability of the demanded power.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a motor vehicle equipped with an electronic control unit by which a drive torque of a drive unit is variably distributed, as required, to at least two axles of the motor vehicle, the method comprising the acts of:
    determining a demanded driving-dynamic desired parameter ($a_{FW}$);
    determining a driving-dynamic potential parameter ($a_{pot}$);
    comparing, via a comparison unit, the demanded driving-dynamic desired parameter ($a_{FW}$) with the driving-dynamic potential parameter ($a_{pot}$); and
    changing from a drive-oriented control specifiable for a primarily single-axle drive of the motor vehicle to a driving-dynamic oriented control for a primarily multi-axle drive of the motor vehicle only when a defined threshold value is exceeded relative to the driving-dynamic potential parameter ($a_{pot}$).

2. The method according to claim 1, wherein
the driving-dynamic potential parameter ($a_{pot}$) corresponds to a circle of forces, and is a result of a maximum possible longitudinal acceleration and a maximum possible transverse acceleration of the motor vehicle.

3. The method according to claim 2, wherein
the demanded driving-dynamic desired parameter ($a_{FW}$) corresponds to the circle of forces, and is a result of a desired longitudinal acceleration and a desired transverse acceleration demanded at least based on an intention of a driver of the motor vehicle.

4. The method according to claim 1, wherein the defined threshold value relative to the driving-dynamic potential parameter ($a_{pot}$) is variably specifiable as a function of a velocity of the motor vehicle.

5. The method according to claim 1, further comprising the act of:
providing an output signal specifying the primarily single-axle drive or the primarily multi-axle drive as a binary signal, whereby a change from the drive-oriented control to the driving-dynamic-oriented control is discretely specifiable.

6. The method according to claim 1, further comprising the act of:
providing an output signal in a form of a tolerance range for a distribution ratio of the drive torque, wherein the change from the drive-oriented control to the driving-dynamic-oriented control is continuously specifiable.

7. The method according to claim 1, further comprising the acts of:
providing a controllable longitudinal clutch between a primarily driven axle (HA) and a secondarily driven axle (VA) of the motor vehicle, the drive unit, being fixedly connected with the primarily driven axle;
setting a distribution ratio of the drive torque between the primarily driven axle and the secondarily driven axle via a triggering of the longitudinal clutch; and
triggering the longitudinal clutch in the disengaging direction for the drive-oriented control and triggering the longitudinal clutch in a direction of at least partial engagement for the driving-dynamic-oriented control.

8. The method according to claim 1, further comprising the acts of:
providing the motor vehicle as a hybrid vehicle without a longitudinal clutch between a primarily driven axle and a secondarily driven axle;
providing an internal-combustion engine for the primarily driven axle;
providing an electric machine for the secondarily driven axle; and
wherein the drive-oriented control is designed to provide an optimal hybrid operating strategy with respect to available power and/or minimal fuel consumption, and wherein the driving-dynamic-oriented control occurs by triggering drive components of the primarily multi-axle drive.

9. A control system for a motor vehicle equipped with a drive unit by which drive torque is variably distributable, as required, to at least two axles of the motor vehicle, the control system comprising:
an electronic control unit and associated memory in which is stored an executable computer program configured to:
compare a demanded-dynamic desired parameter ($a_{FW}$) with a driving-dynamic potential parameter ($a_{pot}$);
change from a drive-oriented control designed for a primarily single-axle drive of the motor vehicle to a driving-dynamic-oriented control designed for a primarily multi-axle drive of the motor vehicle only when a defined threshold value is exceeded relative to the driving-potential parameter ($a_{pot}$).

10. The control system according to claim 9, wherein the electronic control unit is further programmed to:
determine the driving-dynamic potential parameter corresponding to a circle of forces as a result of a maximum possible longitudinal acceleration and a maximum possible transverse acceleration of the motor vehicle.

11. The control system according to claim 10, wherein the electronic control unit is further programmed to:
determine the demanded driving-dynamic desired parameter corresponding to the circle of forces as a result of desired longitudinal acceleration and a desired transverse acceleration demand based on an intention of a driver of the motor vehicle.

12. The control system according to claim 11, wherein the defined threshold value relative to the driving-dynamic potential parameter is variably specifiable as a function of a velocity of the motor vehicle.

13. The control system according to claim 12, wherein the electronic control unit outputs a binary signal for changing between the drive-oriented control and the driving-dynamic-oriented control, whereby the change is discretely specified.

14. The control system according to claim 12, wherein the electronic control unit outputs a tolerance range signal for providing a distribution ratio of the drive torque, whereby the change from the drive-oriented control to the driving-dynamic-oriented control is continuously specified.

\* \* \* \* \*